United States Patent
Kohama et al.

(10) Patent No.: US 9,375,877 B2
(45) Date of Patent: Jun. 28, 2016

(54) METHOD FOR MANUFACTURING POLYIMIDE METAL LAMINATE

(75) Inventors: Shin-ichiro Kohama, Ube (JP); Nobuharu Hisano, Ube (JP); Taizou Murakami, Ube (JP); Kosuke Oishi, Ube (JP); Hiroaki Yamaguchi, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 137 days.

(21) Appl. No.: 14/238,071

(22) PCT Filed: Aug. 10, 2012

(86) PCT No.: PCT/JP2012/070508
§ 371 (c)(1),
(2), (4) Date: Jun. 17, 2014

(87) PCT Pub. No.: WO2013/024819
PCT Pub. Date: Feb. 21, 2013

(65) Prior Publication Data
US 2014/0290853 A1    Oct. 2, 2014

(30) Foreign Application Priority Data

Aug. 12, 2011  (JP) .................................. 2011-177174
Jan. 30, 2012  (JP) .................................. 2012-017365

(51) Int. Cl.
*B29C 65/02* (2006.01)
*B29C 65/00* (2006.01)
*B32B 15/08* (2006.01)
*C08G 73/10* (2006.01)
*B32B 27/28* (2006.01)

(52) U.S. Cl.
CPC ............ *B29C 66/742* (2013.01); *B32B 15/08* (2013.01); *B32B 27/281* (2013.01); *C08G 73/1085* (2013.01); *B32B 2457/00* (2013.01); *B32B 2457/08* (2013.01); *B32B 2457/14* (2013.01)

(58) Field of Classification Search
CPC ............. B29C 66/742; C08G 73/1007; C08G 73/101; C08G 73/1021; C08G 73/1025; C08G 73/1028; C08G 73/1032; C08G 73/1085; Y10T 428/31678
See application file for complete search history.

(56) References Cited

U.S. PATENT DOCUMENTS 3,666,723 A * 5/1972 Kray .................. C08G 73/1085
                                                524/708
3,803,075 A    4/1974 Kray et al.
4,543,295 A * 9/1985 St. Clair .................. B32B 27/34
                                                156/307.7
5,262,227 A    11/1993 Takabayashi et al.
2004/0110015 A1  6/2004 Narui et al.
2010/0316884 A1  12/2010 Narui et al.
2011/0005812 A1 * 1/2011 Shimokawa ............ B32B 15/08
                                                174/255
2012/0308816 A1  12/2012 Kohama et al.

FOREIGN PATENT DOCUMENTS

| CN | 102834432 A | 12/2012 |
|---|---|---|
| JP | H-07-102649 B2 | 2/1992 |
| JP | A-2004-098659 | 4/2004 |
| JP | A-2009-087763 | 4/2009 |
| JP | A-2009-263570 | 11/2009 |
| JP | A-2010-031102 | 2/2010 |

OTHER PUBLICATIONS

Office Action in Chinese Patent Application No. 201280050240.1, mailed Nov. 25, 2014.
International Preliminary Report on Patentability mailed Feb. 27, 2014 in International Application No. PCT/JP2012/070508.

* cited by examiner

*Primary Examiner* — Scott W Dodds
(74) *Attorney, Agent, or Firm* — Knobbe Martens Olson & Bear LLP

(57) ABSTRACT

A method for manufacturing a polyimide-metal laminate including forming a polyimide film, in which at least surfaces of both sides of the film are formed by thermally fusion-bondable polyimide layers (a), and thermal compression-bonding metal layers on both sides of the polyimide film; in which forming the polyimide film includes reacting a tetra-carboxylic dianhydride component with a diamine component containing a diamine compound represented by general formula (1) to give a solution of a polyamic acid (a), forming a self-supporting film from the solution of the polyamic acid (a) and imidizing the self-supporting film by heating at a maximum heating temperature of 440° C. or lower to form the polyimide layer (a);

(1)

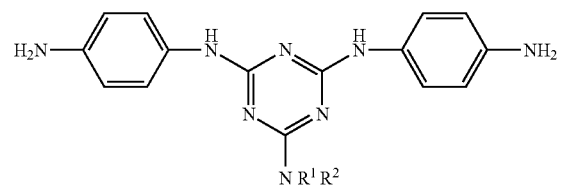

in which $R^1$ represents hydrogen or alkyl or aryl having 1 to 12 carbon atoms; and $R^2$ represents hydrogen or alkyl or aryl having 1 to 12 carbon atoms.

10 Claims, No Drawings

METHOD FOR MANUFACTURING POLYIMIDE METAL LAMINATE

This application is the U.S. National Phase under 35 U.S.C. §371 of International Application No. PCT/JP2012/070508, filed Aug. 10, 2012, designating the U.S., and published in Japanese as WO 2013/024819 on Feb. 21, 2013, which claims priority to Japanese Patent Application No. 2011-177174 filed Aug. 12, 2011; and Japanese Patent Application No. 2012-017365, filed Jan. 30, 2012, the entire contents of which are incorporated herein by reference.

TECHNICAL FIELD

The present invention relates to a polyimide-metal laminate, particularly a polyimide-metal laminate excellent in heat resistance and adhesiveness in an interface between a metal layer and a polyimide film.

BACKGROUND ART

A polyimide film has been extensively used in the fields of electric/electronic devices, semiconductors and so on, because of its excellent heat resistance, chemical resistance, mechanical strength, electric properties, dimensional stability and so on. For example, for a flexible printed circuit board (FPC), there has been used a copper-clad laminated substrate where a copper foil is laminated on one or both sides of a polyimide film.

A polyimide-metal laminate is most commonly produced by laminating a polyimide film with a metal layer such as a metal foil via an adhesive layer, but its heat-resistance or adhesiveness is not sufficient for some applications. For example, Patent Document No. 1 has described a process laminating polyimide having a superficial thermally compression-bondable polyimide layer with a metal foil such as a copper foil by thermal compression-bonding. A polyimide-metal laminate thus produced is excellent in heat resistance and adhesiveness. However, a material which can be used as a thermally compression-bondable polyimide is limited.

Meanwhile, Patent Documents 2 and 5 have described a polyimide made from a triazine-based diamine and examples where a polyimide solution was applied to a metal foil to produce a laminate of the metal foil with the polyimide film.

Furthermore, as examples of the use of a triazine-based diamine, Patent Document 3 has disclosed a terminal-modified imide oligomer based on a triazine-based diamine and Patent Document 4 has disclosed a polymer electrolyte based on a triazine-based diamine.

PRIOR ART REFERENCES

Patent Documents

Patent Document 1: Japanese Examined Patent Publication No. H 07-102649.
Patent Document 2: U.S. Pat. No. 3,803,075.
Patent Document 3: Japanese Patent Laid-Open No. 2009-263570.
Patent Document 4: Japanese Patent Laid-Open No. 2009-87763.
Patent Document 5: Japanese Patent Laid-Open No. 2010-31102.

SUMMARY OF THE INVENTION

Problem to be Solved by the Invention

An objective of the present invention is to provide a method for manufacturing a polyimide-metal laminate in which metal layers are laminated on both sides of a polyimide film, and having excellent adhesiveness between a polyimide film and a metal layer and excellent heat resistance.

Means for Solving the Problem

The present invention relates to the followings items.
1. A method for manufacturing a polyimide-metal laminate, comprising the steps of:
    forming a polyimide film, in which at least surfaces of both sides of the film are formed by polyimide layers (a), and;
    thermal compression-bonding metal layers on both sides of the polyimide film,
    wherein the step of forming a polyimide film comprises reacting a tetracarboxylic dianhydride component with a diamine component containing a diamine compound represented by general formula (1) to give a solution of a polyamic acid (a), forming a self-supporting film from the solution of the polyamic acid (a), and imidizing the self-supporting film by heating at a maximum heating temperature of 440° C. or lower to form the polyimide layer (a);

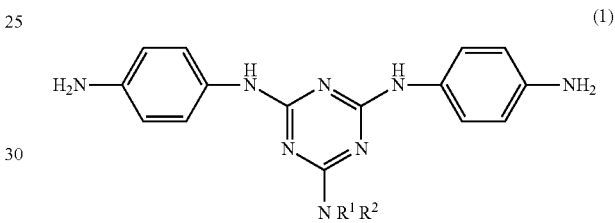

wherein $R^1$ hydrogen or alkyl or aryl having 1 to 12 carbon atoms; and $R^2$ represents hydrogen or alkyl or aryl having 1 to 12 carbon atoms.
2. The method for manufacturing a polyimide-metal laminate according to the above item 1, wherein after forming the self-supporting film from the solution of the polyamic acid (a), the film is imidized by heating at a maximum heating temperature of 320 to 370° C. to form the polyimide layer (a).
3. The method for manufacturing a polyimide-metal laminate according to the above item 1 or 2,
    wherein the polyimide film has a single layer structure of the polyimide layer (a), and
    wherein the step of forming of the polyimide film comprises forming a self-supporting film from the solution of the polyamic acid (a), and then imidizing by heating at a maximum heating temperature of 440° C. or lower, to form the polyimide film having a single layer structure of the polyimide layer (a).
4. The method for manufacturing a polyimide-metal laminate according to the above item 1 or 2,
    wherein the polyimide film has a multilayer structure having the polyimide layers (a) and another polyimide layer (b), and
    the polyimide layers (a) are disposed on both outermost sides of the multilayer structure, and the polyimide layer (b) is disposed in inner part of the multilayer structure, and
    wherein the step of forming the polyimide film comprises forming a multilayer liquid film having at least three layers from the solution of the polyamic acid (a) and a solution of a polyamic acid (b) for forming the polyimide layer (b) such that at least the solution of the polyamic acid (a) forms the uppermost and the bottom layers, and forming a self-supporting film from the multilayer liquid film thus formed, and then imidizing by heating at a maximum heating temperature of 440° C. or lower to form the polyimide layers (a) and the polyimide layer (b).

5. The method for manufacturing a polyimide-metal laminate according to the above item 1 or 2, wherein the polyimide film has a multilayer structure having the polyimide layers (a) and another polyimide layer (b), and the polyimide layers (a) are disposed on both outermost sides of the multilayer structure, and the polyimide layer (b) is disposed in inner part of the multilayer structure, and wherein the step of forming the polyimide film comprises applying the solution of the polyamic acid (a) to both sides of a self-supporting film produced from a solution of a polyamic acid (b) for forming the polyimide layer (b), and drying to form a self-supporting film having a multilayer structure, and then imidizing by heating at a maximum heating temperature of 440° C. or lower to form the polyimide layers (a) and the polyimide layer (b).

6. The method for manufacturing a polyimide-metal laminate according to any one of the above items 1 to 5, wherein the diamine compound represented by general formula (I) is 2,4-bis(4-aminoanilino)-6-anilino-1,3,5-triazine.

7. The method for manufacturing a polyimide-metal laminate according to any one of the above items 1 to 6, wherein the diamine component comprises a diamine compound represented by general formula (1) in the range of 5 to 100 mol %.

8. The method for manufacturing a polyimide-metal laminate according to any one of the above items 1 to 6, wherein the diamine component comprises a diamine compound represented by general formula (I) in the range of 25 to 100 mol %.

9. The method for manufacturing a polyimide-metal laminate according to any one of the above items 1 to 8, wherein the diamine component further comprises at least one compound selected from para-phenylenediamine and 4,4'-diaminodiphenyl ether.

10. The method for manufacturing a polyimide-metal laminate according to any one of the above items 1 to 9, wherein the tetracarboxylic dianhydride component comprises at least one compound selected from 3,3',4,4'-biphenyltetracarboxylic dianhydride and pyromellitic dianhydride.

Effect of the Invention

According to the present invention, there can be provided a method for manufacturing a polyimide-metal laminate having excellent adhesiveness between a polyimide film and a metal layer and excellent heat resistant.

After intense investigation, we have found that when a polyimide film is produced using a triazine-based diamine, a polyimide film prepared at a properly selected curing temperature has good thermally fusion-bondability which allows for lamination with a metal foil such as a copper foil by thermal compression-bonding, and the polyimide film having metal foils laminated on both sides thereof exhibits good adhesiveness and excellent heat resistance, achieving the present invention.

BEST MODE FOR CARRYING OUT THE INVENTION

A manufacturing process of the present invention includes forming a polyimide film in which at least surfaces of both sides of the film are formed by polyimide layer (a); and piling metal layers on both sides of the polyimide film and then performing thermal compression-bonding.

The polyimide layer (a) may be provided by heating, at a maximum heating temperature of 440° C. or lower, a solution of a polyamic acid (a) which is prepared by reacting a tetracarboxylic dianhydride component with a diamine component containing a diamine compound represented by general formula (1).

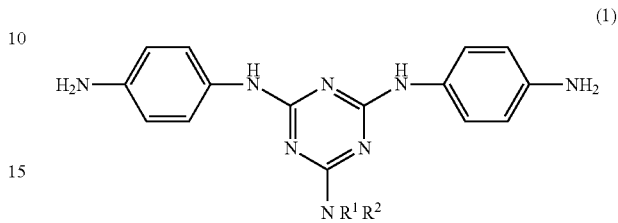

wherein $R^1$ represents hydrogen or alkyl or aryl having 1 to 12 carbon atoms; and $R^2$ represents hydrogen or alkyl or aryl having 1 to 12 carbon atoms.

The polyimide film can have a single-layer structure of the polyimide layer (a) or a multilayer structure in which another polyimide layer (single-layer or multilayer) is sandwiched by the surface polyimide layers (a). A multilayer structure can be, for example, a three-layer structure such as polyimide layer (a)/polyimide layer (b)/polyimide layer (a).

There will be described a producing process separately divided into the case where a polyimide film has a single-layer structure of polyimide layer (a) (hereinafter, referred to as a "single-layer type film") and the case where a polyimide film has a multilayer structure containing another polyimide layer (hereinafter, referred to as a "multilayer type film").

In the description below, a tetracarboxylic dianhydride component is sometimes abbreviated as a "tetracarboxylic acid component".

<<Method for Manufacturing a Single-Layer Type Film of Polyimide Layer (a)>>

There will be described a method for manufacturing a polyimide film consisting of a single layer of polyimide layer (a).

This polyimide film is a polyimide film consisting of a single polyimide layer which is produced by reacting a tetracarboxylic dianhydride component with a diamine component containing a diamine compound represented by general formula (1) in a proportion of more than 0 mol % to 100 mol %, preferably 5 to 100 mol %, further preferably 10 to 100 mol %, preferably 15 to 100 mol %, more preferably 17 to 100 mol %, particularly preferably 20 to 100 mol %, and in a particular embodiment 25 to 100 mol %.

The polyimide film is obtained by thermal imidization and/or chemical imidization, and in case that plurality of tetracarboxylic acid components and/or diamine components are included, it may be a random copolymer or block copolymer, or combination of these.

The thickness of the polyimide film is not particularly limited, but it is 5 to 120 μm, preferably 12.5 to 75 μm, further preferably 12.5 to 50 μm.

Examples of a process for manufacturing a polyimide film of this aspect generally include (1) a process comprising the steps of flow-casting a polyamic acid solution (including a polyamic acid solution composition prepared by adding, as necessary, additives selected from an imidization catalyst, a dehydrating agent, a release assisting agent, inorganic fine particles and so on, to a polyamic acid solution) on a support and drying the solution by heating to give a self-supporting film, and then heating it for cyclodehydration and desolvation to give a polyimide film (thermal imidization method), and (2) a process comprising the steps of flow-casting a polyamic acid solution containing a cyclization catalyst and a dehydrating agent (and further, if necessary containing inorganic fine particles and the like) on a support, advancing chemical cyclodehydration and, as necessary, drying it by heating to give a self-supporting film, and then heating it for desolvation and imidization to give a polyimide film (chemical imidization method).

In the above process, for a heating temperature in the heating step after forming a self-supporting film, the highest heating temperature (a maximum heating temperature) is 440° C. or lower, preferably 400° C. or lower, further preferably higher than 280° C. and 440° C. or lower, more preferably higher than 280° C. and 400° C. or lower, particularly preferably 320 to 370° C., in particular embodiments 340 to 370° C., further 350 to 370° C. A polyimide film thus formed can give a polyimide-metal laminate having excellent peeling strength. It will be detailed later for the step of heating (imidization).

In the above process, heating at the maximum heating temperature may be performed on a support or may be performed after the self-supporting film is peeled from the support.

There will be described production processes and starting materials used for the polyimide.

<Tetracarboxylic Acid Component and Diamine Component Used in Polyimide Layer (a)>

The specific examples of the tetracarboxylic dianhydride include 3,3',4,4'-biphenyl tetracarboxylic dianhydride (s-BPDA), pyromellitic dianhydride (PMDA), 2,3,3',4'-biphenyl tetracarboxylic dianhydride (a-BPDA), oxydiphthalic dianhydride, diphenyl sulfone-3,4,3',4'-tetracarboxylic dianhydride, bis(3,4-dicarboxyphenyl)sulfide dianhydride, 2,2-bis(3,4-dicarboxyphenyl)-1,1,1,3,3,3-hexafluoropropane dianhydride (6FDA), 2,3,3',4'-benzophenone tetracarboxylic dianhydride, 3,3',4,4'-benzophenone tetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis(trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalene tetracarboxylic dianhydride, 1,4,5,8-naphthalene tetracarboxylic dianhydride, 4,4'-(2,2-hexafluoroisopropylidene) diphthalic dianhydride. These are used alone or in combination of two or more. The tetracarboxylic dianhydride used herein is suitably selected in consideration of desired properties and the like.

The tetracarboxylic acid component preferably comprises at least s-BPDA and/or PMDA, and for example, contains s-BPDA preferably in an amount of 50 mol % or more, more preferably 70 mol % or more, particularly preferably 75 mol % or more, based on 100 mol % of the tetracarboxylic acid component.

A polyimide film obtained using the tetracarboxylic acid component containing s-BPDA in these amounts is excellent in mechanical property and the like. In another embodiment, the tetracarboxylic acid component comprises PMDA preferably in an amount of 50 mol % or more, more preferably 70 mol % or more, particularly preferably 75 mol % or more, based on 100 mol % of the tetracarboxylic acid component. A polyimide film obtained using the tetracarboxylic acid component containing PMDA in these amounts is excellent in mechanical property and the like.

The diamine component comprises an diamine compound represented by general formula (1).

In a diamine compound represented by formula (1), $R^1$ denotes a hydrogen atom or alkyl or aryl having 1 to 12 carbon atoms (preferably 1 to 10 carbon atoms, further preferably 1 to 6 carbon atoms), $R^2$ denotes a hydrogen atom or alkyl or aryl having 1 to 12 carbon atoms (preferably 1 to 10 carbon atoms, further preferably 1 to 6 carbon atoms) and $R^1$ and $R^2$ may be the same or different.

Specific examples of alkyl or aryl having 1 to 12 carbon atoms for $R^1$ and $R^2$ include methyl, ethyl, propyl, isopropyl, butyl, isobutyl, t-butyl, phenyl, benzyl, naphthyl, methylphenyl and biphenyl.

Among three groups bonding to the triazine ring, two groups other than $NR^1R^2$ group are 4-aminoanilino (para-configuration).

The specific examples of diamine represented by general formula (I) include 2,4-bis(4-aminoanilino)-6-anilino-1,3,5-triazine, 2,4-bis(4-aminoanilino)-6-benzylamino-1,3,5-triazine, 2,4-bis(4-aminoanilino)-6-naphthylamino-1,3,5-triazine, 2,4-bis(4-aminoanilino)-6-biphenylamino-1,3,5-triazine, 2,4-bis(4-aminoanilino)-6-diphenylamino-1,3,5-triazine, 2,4-bis(4-aminoanilino)-6-dibenzylamino-1,3,5-triazine, 2,4-bis(4-aminoanilino)-6-dinaphthylamino-1,3,5-triazine, 2,4-bis(4-aminoanilino)-6-N-methylanilino-1,3,5-triazine, 2,4-bis(4-aminoanilino)-6-N-methylnaphthylamino-1,3,5-triazine, 2,4-bis(4-aminoanilino)-6-methylamino-1,3,5-triazine, 2,4-bis(4-aminoanilino)-6-ethylamino-1,3,5-triazine, 2,4-bis(4-aminoanilino)-6-dimethylamino-1,3,5-triazine, 2,4-bis(4-aminoanilino)-6-diethylamino-1,3,5-triazine, 2,4-bis(4-aminoanilino)-6-dibutylamino-1,3,5-triazine, 2,4-bis(4-aminoanilino)-6-amino-1,3,5-triazine and the like.

The diamine component may comprise diamine compound(s) that is generally used in the production of polyimide (co-diamine compound) in addition to the diamine compound represented by general formula (I). The specific examples include:

1) diamines having one benzene ring, such as para-phenylene diamine(1,4-diaminobenzene; PPD), 1,3-diaminobenzene, 2,4-toluenediamine, 2,5-toluenediamine, 2,6-toluenediamine, 2) diamines having two benzene rings, for example diaminodiphenyl ethers, such as 4,4'-diaminodiphenyl ether (DADE), 3,3'-diaminodiphenyl ether, 3,4'-diaminodiphenyl ether; 4,4'-diaminodiphenyl methane, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenyl methane, 3,3'-dicarboxy-4,4'-diaminodiphenyl methane, 3,3',5,5'-tetramethyl-4,4'-diaminodiphenyl methane, bis(4-aminophenyl)sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diaminodiphenyl methane, 3,4'-diaminodiphenyl methane, 4,4'-diaminodiphenyl methane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide, 4,4'-diaminodiphenyl sulfoxide, 3) diamines having three benzene rings, for example, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, 4) diamines having four benzene rings, for example, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane. These are used alone or in combination of two or more. The diamine used herein is suitably selected in consideration of desired properties and the like.

In the present invention, a diamine compound represented by formula (1) is used in an amount of more than 0 to 100 mol % or less, preferably 5 to 100 mol %, further preferably 10 to 100 mol %, preferably 15 to 100 mol %, more preferably 17 to 100 mol %, particularly preferably 20 to 100 mol %, and in a specific embodiment 25 to 100 mol %, based on the total diamine component (=100 mol %).

When diamine(s) other than the diamine compound represented by formula (1) is used, the diamine component comprises diamine compound preferably selected from paraphenylene diamine (PPD) and diaminodiphenyl ethers, more preferably one or more compound selected from PPD, 4,4'-diaminodiphenyl ether and 3,4'-diaminodiphenyl ether. A polyimide film obtained therefrom is excellent in mechanical property and the like. Co-use of PPD is advantageous in that the obtained polyimide film is particularly excellent in mechanical property. Co-use of 4,4'-diaminodiphenyl ether and/or 3,4'-diaminodiphenyl ether is advantageous in that the obtained polyimide film exhibits high peel strength in addition to excellent in mechanical property, and furthermore advantageous in that the obtained polyimide film exhibits high peel strength even from a small amount of the diamine compound represented by formula (1), for example 5 mol % or more.

A polyimide of the present invention is preferably free from at least one proton-conducting functional group selected from the group consisting of —$SO_3H$, —COOH and —$PO_3H_2$ as described in Patent Document 4, for excellent heat resistance, which is also applicable to the other aspects.

<Preparation of a Polyamic Acid (a) Solution>

A polyamic acid (polyimide precursor) providing a polyimide layer (a) is produced by reacting a tetracarboxylic acid component and a diamine component in a known manner; for example, substantially equimolar components may be reacted in an organic solvent to give a solution of a polyamic acid (partial imidization may be allowed to take place if the solution is maintained in homogeneous state). Alternatively, two or more polyamic acids in which one of the components is relatively excessively contained are preliminarily synthesized, and these polyamic acid solutions can be combined and mixed under the reaction conditions. The polyamic acid solution thus prepared can be used for production of a self-supporting film as it is or, as necessary, after removing or adding a solvent.

An organic solvent used herein for the polyamic acid solution can be a known solvent, examples of which include amides such as N-methyl-2-pyrrolidone, N,N-dimethylacetamide, N,N-diethylacetamide, N,N-dimethylformamide, N,N-diethylformamide and hexamethylsulforamide; sulfoxides such as dimethyl sulfoxide and diethyl sulfoxide; and sulfones such as dimethyl sulfone and diethyl sulfone. These solvents may be used alone or in combination. For example, N-methyl-2-pyrrolidone, N,N-dimethylformamide, N,N-dimethylacetamide, N,N-diethylacetamide and the like are preferred. These solvents may be used alone or in combination of two or more.

In the polymerization reaction of a polyamic acid, a concentration of the total monomers in an organic polar solvent can be appropriately selected depending on an intended use; for example, a concentration of the total monomers in an organic polar solvent is preferably 10% by mass to 30% by mass, further preferably 15% by mass to 27% by mass, particularly preferably 18% by mass to 26% by mass.

As an example of a process for preparing a polyamic acid, the above polymerization reaction of an aromatic tetracarboxylic acid component and an aromatic diamine component is conducted, for example, by mixing them in substantially equimolar amounts or in amounts such that one of them is slightly in excess of the other component (the acid component or the diamine component) and reacting them at a reaction temperature of 100° C. or lower, preferably 80° C. or lower for about 0.2 to 60 hours to give a polyamic acid solution.

For thermal imidization, the polyamic acid solution may contain, as necessary, an imidization catalyst, an organic phosphorous-containing compound, inorganic fine particles or the like. For chemical imidization, the polyamic acid solution may contain, as necessary, a cyclization catalyst, a dehydrating agent, inorganic fine particles or the like. The polyimide solution may contain an organic phosphorous-containing compound, inorganic fine particles or the like. Furthermore, inorganic fine particles may be replaced by polyimide fine particles insoluble in an organic solvent.

Examples of an imidization catalyst include substituted or unsubstituted nitrogen-containing heterocyclic compounds, N-oxide compounds of the nitrogen-containing heterocyclic compounds, substituted or unsubstituted amino acid compounds, hydroxy-containing aromatic hydrocarbon compounds or aromatic heterocyclic compounds. Particularly preferably used is lower-alkylimidazoles such as 1,2-dimethylimidazole, N-methylimidazole, N-benzyl-2-methylimidazole, 2-methylimidazole, 2-ethyl-4-methylimidazole and 5-methylbenzimidazole; benzimidazoles such as N-benzyl-2-methylimidazole; isoquinoline; and substituted pyridines such as 3,5-dimethylpyridine, 3,4-dimethylpyridine, 2,5-dimethylpyridine, 2,4-dimethylpyridine and 4-n-propylpyridine. The amount of the imidization catalyst is preferably about 0.01 to 2 equivalents, particularly preferably about 0.02 to 1 equivalents based on amide acid units in a polyamide acid. The use of an imidization catalyst sometimes improves physical properties of a polyimide film obtained, particularly elongation and edge-break resistance.

Examples of an organic phosphorous-containing compound include phosphoric esters such as monocaproyl phosphoric ester, monooctyl phosphoric ester, monolauryl phosphoric ester, monomyristyl phosphoric ester, monocetyl phosphoric ester, monostearyl phosphoric ester, tirethyleneglycol monotridecyl ether monophosphoric ester, tetraethyleneglycol monolauryl ether monophosphoric ester, diethyleneglycol monostearyl ether monophosphoric ester, dicaproyl phosphoric ester, dioctyl phosphoric ester, dicapryl phosphoric ester, dilauryl phosphoric ester, dimyristyl phosphoric ester, dicetyl phosphoric ester, distearyl phosphoric ester, tetraethyleneglycol mononeopentyl ether diphosphoric ester, triethyleneglycol monotridecyl ether diphosphoric ester, tetraethyleneglycol monolauryl ether diphosphoric ester and diethyleneglycol monostearyl ether diphosphoric ester and amine salts of these phosphoric esters. Examples of an amine include ammonia, monomethylamine, monoethylamine, monopropylamine, monobutylamine, dimethylamine, diethylamine, dipropylamine, dibutylamine, trimethylamine, triethylamine, tripropylamine, tributylamine, monoethanolamine, diethanolamine and triethanolamine.

Examples of a cyclization catalyst include aliphatic tertiary amines such as trimethylamine and triethylenediamine; aromatic tertiary amines such as dimethylaniline; and heterocyclic tertiary amines such as isoquinoline, pyridine, α-picoline and β-picoline.

Examples of a dehydrating agent include aliphatic carboxylic anhydrides such as acetic anhydride, propionic anhydride and butyric anhydride; and aromatic carboxylic anhyrides such as benzoic anhydride.

Examples of inorganic fine particles include inorganic oxide powders such as fine-particulate titanium dioxide powder, silicon dioxide (silica) powder, magnesium oxide powder, aluminum oxide (alumina) powder and zinc oxide powder; inorganic nitride powders such as fine-particulate silicon nitride powder and titanium nitride powder; inorganic carbide powders such as silicon carbide powder; and inorganic salt powders such as fine-particulate calcium carbonate powder, calcium sulfate powder and barium sulfate powder. These inorganic fine particles may be used in combination of two or more. For homogeneously dispersing these inorganic fine particles, a means known per se can be applied.

<Production of a Self-Supporting Film from a Polyamic Acid Solution>

A self-supporting film from a polyamic acid solution (a) is produced by applying a polyamic acid solution on a support by flow casting to form a liquid film, and then heating it to such an extent that it becomes self-supporting state (it means it is in a stage before a usual curing process), for example, heating to such an extent that it can be peeled from the support.

There are no particular restrictions to a solid concentration of the polyamic acid solution (a) as long as a viscosity is within the range suitable for the production, but generally, it is preferably 10 to 30% by mass, further preferably 15 to 27% by mass, and particularly preferably 18 to 26% by mass.

A temperature and duration of heating in producing a self-supporting film is determined as appropriate. For thermal imidization, heating is conducted, for example, at a temperature of 100 to 180° C. for about 1 to 60 min.

There are no particular restrictions to a support as long as a polyamic acid solution can be cast on it, but it is preferably a smooth substrate; for example, a metal (for example, stainless steel) drum or belt.

There are no particular restrictions to the self-supporting film as long as a solvent has been removed such that the film can be peeled from a support and/or it is imidized, but in thermal imidization, a weight-loss-after-heating is preferably within the range of 20 to 50% by mass and when a weight-loss-after-heating is within the range of 20 to 50% by mass and an imidization rate is within the range of 7 to 55%, a self-supporting film has satisfactory dynamic properties. Furthermore, a weight-loss-after-heating and an imidization rate in a self-supporting film within the above ranges are preferable because a coating solution can be uniformly and smoothly applied to the surface of the self-supporting film and no defects such as blisters, tears, crazes, cracks and fissures are observed in a polyimide film after imidization.

Here, a weight-loss-after-heating of a self-supporting film is determined in accordance with the following equation from a mass of the self-supporting film (W1) and the mass of a cured film (W2).

$$\text{Weight-loss-after-heating (\% by mass)} = \{(W1-W2)/W1\} \times 100$$

An imidization rate of the partially imidized self-supporting film is calculated by taking IR spectra of the self-supporting film and its fully-cured product (polyimide film) by the ATR method and determining an area or height of a vibrational band peak. A vibrational band peak employed can be, for example, a symmetric stretching vibration band of an imidocarbonyl group or a stretching vibration band of a benzene ring. More specifically, FT-IR spectra of a self-supporting film and its fully-cured film (polyimide film) were taken by the multireflection ATR method with Ge crystal and an incident angle of 45° using FT/IR6100 from JASCO Corporation, and an imidization rate was calculated in accordance with the following equation (1) using a ratio of a peak height of asymmetric stretching vibration of imidocarbonyl group at 1775 cm$^{-1}$ to a peak height of carbon-carbon symmetric stretching vibration of an aromatic ring at 1515 cm$^{-1}$.

$$\text{Imidization rate (\%)} = \{(X1/X2)/(Y1/Y2)\} \times 100 \qquad (1)$$

wherein
X1: peak height of a self-supporting film at 1775 cm$^{-1}$,
X2: peak height of a self-supporting film at 1515 cm$^{-1}$,
Y1: peak height of a fully-cured film at 1775 cm$^{-1}$,
Y2: peak height of a fully-cured film at 1515 cm$^{-1}$.

<Heating (Imidization) Step>

Subsequently, the self-supporting film heated to give a polyimide film. In the present invention, for giving a film exhibiting excellent adhesiveness, it is important to control the maximum heating temperature in the heat treatment. The maximum heating temperature is 440° C. or lower, preferably 400° C. or lower, and on the other hand, it is necessary to heat it at a temperature higher than that is necessary for the imidization to proceed, preferably higher than 280° C. and 440° C. or lower, more preferably higher than 280° C. and 400° C.

or lower, particularly preferably 320 to 370° C., and in specific embodiment 340 to 370° C., and furthermore 350 to 370° C.

Suitably, heating is first conducted at a temperature of about 100° C. to 350° C. for gradually imidizing the polymer and evaporating/removing the solvent over about 0.05 to 5 hours, particularly 0.1 to 3 hours. Particularly, the heating is preferably conducted stepwise, that is, the first heating at a relatively lower temperature of about 100° C. to about 170° C. for about 0.5 to 30 min, then the second heating at a temperature of higher than 170° C. and 220° C. or lower for about 0.5 to 30 min, then the third heating at an elevated temperature of higher than 220° C. and lower than 300° C. for about 0.5 to 30 min, and then the forth heating at an elevated temperature of 300° C. or higher to 440° C. or lower, preferably 400° C. or lower. The heating process can be conducted sequentially or continuously.

In heating in an industrial production, a long self-supporting film may be fixed at least at both edges in a direction perpendicular to its longitudinal direction, that is, in a width direction of the film by a fixing means such as pin tenters, clips and a frame in a cure furnace while the film is, if necessary, extended or contracted either in a width direction or in a longitudinal direction.

Then, the polyimide film of the present invention produced as described above may be further processed by, for example, sandblasting, corona treatment, plasma treatment or etching.

For the polyimide film of the present invention produced as described above, in the case that the concentration of the diamine represented by formula (1) is high (for example, 30 mol % or higher) in the total diamine component, a polyimide film having thicker thickness (for example, 25 μm or more) is more preferable than that having thinner thickness to obtain a polyimide film having good appearance of film.

In case that the tetracarboxylic acid component is PMDA and the concentration of the diamine represented by formula (I) is high (for example, 80 mol % or higher) in the total diamine component, it is preferable that the maximum heating temperature in the heating process (imidizing process) is lower (for example. 300 to 400° C.) to obtain a polyimide film having good appearance of film. In addition, when the diamine compound of formula (1) is used, use of s-BPDA tends to provide a polyimide-metal laminate having larger peeling strength than the use of PMDA. In case that the tetracarboxylic acid component is PMDA and the concentration of the diamine represented by formula (1) is high (for example, 80 mol % or higher) in the total diamine component, a polyimide-metal laminate having large peeling strength is obtained.

According to the manner explained above, the polyimide film having a single-layer structure of thermally fusion-bondable polyimide layer (a) (single-layer type film) is obtained.

<<Method for Manufacturing a Multilayer Type Film Having Polyimide Layer (a) as Outermost Layers>>

There will be described a method for manufacturing a multilayer type film. A multilayer type film is a polyimide film formed by sandwiching another polyimide layer (single- or multi-layer) between surface polyimide layers (a). As a multilayer structure, there will be described a structure of three mutually-contactingly laminated layers such as polyimide layer (a)/polyimide layer (b)/polyimide layer (a). When the inner layer consists of two or more layers, such a structure can be similarly formed, regarding that there are two or more polyimide layers (b) made of different materials.

The term, "mutually-contactingly laminated" refers to the state that polyimide layer (a) is laminated in contact with the surface of polyimide layer (b). In the course of producing a polyimide film of the present invention, a contacting region (boundary region) between laminated polyimide layer (a) and polyimide layer (b) may be chemically modified by a polyamic acid (a) solution and a polyamic acid (b) solution for forming corresponding polyimide layers, as if a middle layer (including a gradient layer in which a composition continuously varies) is formed. An embodiment in which such a middle layer is formed is within the scope of the present invention.

A multilayer type film is advantageous in that polyimide layer (a) can endow the surface with thermally fusion-bondability, maintaining good properties such as mechanical properties and heat resistance of polyimide layer (b).

A thickness of polyimide layer (a) can be varied as appropriate; for example, about 0.2 μm to 100 μm per one layer. When multilayer extrusion method as described later is employed, a thickness is for example 0.2 μm to 100 μm, preferably 0.5 μm to 100 μm per one layer, while when coating method is employed, a thickness is for example 0.2 μm to 10 μm, preferably 0.2 μm to 3 μm per one layer. A thickness of polyimide layer (b) can be varied as appropriate; for example, it is 5 μm to 75 μm, preferably about 12.5 μm to 50 μm per one layer.

A thickness of a multilayer type polyimide film containing polyimide layer (a) and polyimide layer (b) is, but not limited to, 5 to 120 μm, preferably 12.5 to 75 μm, further preferably 12.5 to 50 μm.

A polyimide film having a multilayer structure can be produced by multilayer extrusion method or coating method, each of which is based on thermal imidization method or chemical imidization method, and therefore, the processes can be classified into the following four categories.

(I-1) Method comprising a step of, by the coextrusion-flow-casting film formation method (also simply referred to as multilayer extrusion), casting the polyamic acid (a) solution giving polyimide layers (a) and the polyamic acid (b) solution giving a polyimide layer (b) on a support, drying it by heating to give a self-supporting film (gel film); and a step of thermally cyclodehydrating and desolvating the obtained self-supporting film to give a polyimide film (coextrusion-thermal imidization);

(I-2) Method comprising a step of, by the coextrusion-flow-casting film formation method, casting the polyamic acid (a) solution giving polyimide layers (a) and the polyamic acid (b) solution giving a polyimide layer (b) on a support, advancing chemical cyclodehydration and, as necessary, drying it by heating to give a self-supporting film; and a step of heating for desolvating it and completing imidization to give a polyimide film (coextrusion-chemical imidization);

(II-1) Method comprising a step of casting the polyamic acid (b) solution giving a polyimide layer (b) on a support and drying it by heating to give a self-supporting film, and a step of applying the polyamic acid (a) solution giving polyimide layers (a) on both side of the self-supporting film and thermally cyclodehydrating and desolvating it for imidization to give a polyimide film (coating method-thermal imidization);

(II-2) Method comprising a step of casting the polyamic acid (b) solution giving a polyimide layer (b) on a support, advancing chemical cyclodehydration and, as necessary, drying it by heating to give a self-supporting film, and a step of applying the polyamic acid (a) solution giving polyimide layers (a) on one side or both sides of the self-supporting film and thermally cyclodehydrating and desolvating it for imidization to give a polyimide film (coating method—chemical imidization);

The above polyamic acid solution may contain, as necessary, an imidization catalyst, a dehydrating agent, a release assisting agent and inorganic particles in the case of thermal imidization. In the case of chemical imidization, the above polyamic acid solution contains an imidization catalyst, a cyclization catalyst and a dehydrating agent and, if necessary, further inorganic particles. As a variation method of the above four methods, one of polyimide layer (a) and polyimide layer (b) can be thermally imidized while the other being chemically imidized.

There will be described a producing process in association with starting materials used for a polyimide.

<Tetracarboxylic Acid Component and Diamine Component as Starting Materials for Polyimide Layer (b)>

The starting materials for polyimide layer (a) are as described for a method for manufacturing a single-layer type film of polyimide layer (a), and therefore, the starting materials for polyimide layer (b) will be described.

Specific examples of a tetracarboxylic dianhydride used for polyimide layer (b) can be those listed as a tetracarboxylic acid component as a starting material for polyimide layer (a). A tetracarboxylic acid component preferably contains at least s-BPDA and/or PMDA. For example, in 100 mol % of a tetracarboxylic acid component, s-BPDA is contained preferably in 50 mol % or more, more preferably in 70 mol % or more, particularly preferably in 75 mol % or more. A polyimide film formed using a tetracarboxylic acid component containing s-BPDA in such a proportion is excellent in, for example, mechanical properties. In another embodiment, for example, in 100 mol % of a tetracarboxylic acid component, PMDA is contained preferably in 50 mol % or more, more preferably in 70 mol % or more, particularly preferably in 75 mol % or more. A polyimide film formed using a tetracarboxylic acid component containing PMDA in such a proportion is excellent in, for example, mechanical properties.

Specific examples of a diamine compound used for polyimide layer (b) can be those listed as a "co-diamine compound" other than a diamine compound represented by general formula (I) in the description of a method for manufacturing a single-layer type film of polyimide layer (a).

A diamine component used for polyimide layer (b) contains preferably a diamine compound selected from para-phenylenediamine (PPD) and diaminodiphenyl ether, more preferably one or more compounds selected from PPD, 4,4'-diaminodiphenyl ether and 3,4'-diaminodiphenyl ether, particularly preferably PPD in an amount of 50 mol % or more, more preferably 70 mol % or more, particularly preferably 75 mol % or more, based on the total diamine components (=100 mol %). A polyimide film thus formed is excellent in mechanical properties and the like.

Polyimide layer (b) is, inter alia, preferably a polyimide produced from s-BPDA and PPD or, in certain cases, PPD and a diaminodiphenyl ether such as 4,4'-diaminodiphenyl ether and 3,4'-diaminodiphenyl ether. Herein, a PPD/diaminodiphenyl ether (molar ratio) is preferably 100/0 to 85/15.

Also preferred is a polyimide produced from aromatic tetracarboxylic dianhydride(s) of PMDA or a combination of s-BPDA and PMDA, and aromatic diamine(s) of PPD, tolidine (ortho or meta) or a diaminodiphenyl ether such as 4,4'-diaminodiphenyl ether and 3,4'-diaminodiphenyl ether. The aromatic diamine is preferably PPD or aromatic diamine in which PPD/diaminodiphenyl ether (molar ratio) is 90/10 to 10/90. In this case, s-BPDA/PMDA is preferably 0/100 to 90/10.

Furthermore, also preferred is a polyimide produced from PMDA, and PPD and diaminodiphenyl ether such as 4,4'-diaminodiphenyl ether and 3,4'-diaminodiphenyl ether. In this case, diaminodiphenyl ether/PPD (molar ratio) is preferably 90/10 to 10/90.

<Preparation of a Polyamic Acid Solution>

A polyamic acid (b) solution for producing polyimide layer (b) can be prepared by reacting a tetracarboxylic acid component with a diamine component by a known method; for example, in substantially equal molar amounts, these can be reacted in an organic solvent to provide a polyamic acid solution which can be partially imidized if a homogeneous solution state is maintained. Alternatively, two or more polyamic acids in which one component is excessive are synthesized in advance, and then these polyamic acid solutions are combined and mixed under the reaction conditions. A polyamic acid solution thus prepared can be used as such or, if necessary, after removing or adding a solvent, for production of a self-supporting film.

Factors such as a solvent, reaction conditions and additives in preparing a polyamic acid (b) solution are essentially same as described for preparation of a polyamic acid (a) solution in a method for manufacturing a single-layer type film. Furthermore, a polyamic acid (a) solution used for a method for manufacturing a multilayer type film is essentially same as described for a method for manufacturing a single-layer type film.

However, a concentration of total monomers in an organic polar solvent is appropriately chosen, depending on an intended use and a production purpose, and the concentration and viscosity of solution are also appropriately chosen, depending on a purpose.

For preparing a polyamic acid (b) solution, the concentration of total monomers in the organic polar solvent is preferably 5 to 40% by mass, further preferably 6 to 35% by mass, particularly preferably 10 to 30% by mass.

For preparing a polyamic acid (a) solution for coextrusion-flow casting film formation method (multilayer extrusion method), a concentration of total monomers in an organic polar solvent is, for example, preferably 10% by mass to 30% by mass, further preferably 15% by mass to 27% by mass, particularly preferably 18% by mass to 26% by mass, as described for a method for manufacturing a single-layer type film. It is preferable that in case of coating method, a polyamic acid solution (a) is appropriately determined within the range where a polymerization reaction is permitted and it is easily handled. As described later, a solid concentration in a polymer solution (a) used in coating method is preferably 1 to 15% by mass, more preferably 2 to 8% by mass. Therefore, the monomer concentration in polymerization can be determined such that the concentration becomes such a level during polymerization, or alternatively polymerization is conducted at a high concentration and then the solution can be diluted to provide the coating solution.

<Production of a Self-Supporting Film from a Polyamic Acid Solution>

First, there will be described the case where a self-supporting film is formed by coextrusion-flow casting film formation method {for (I-1) and (I-2)}.

A polyamic acid (a) solution and a polyamic acid (b) solution are flow-cast on a support to form a multilayer liquid film, which is then dried by heating to give a self-supporting film (gel film). Here, for example, a polyamic acid (a) solution/a polyamic acid (b) solution/a polyamic acid (a) solution are co-extruded as a three layer coating, which is then heated to such an extent that it becomes self-supporting (this means a step before a usual curing step), for example to such an extent that it can be removed from a support, to produce a self-supporting film.

There are no particular restrictions to a solid concentration in a polyamic acid solution (b) as long as it gives a viscosity within a range suitable for production, and in general, it is preferably 5 to 40% by mass, further preferably 6 to 35% by mass, particularly preferably 10 to 30% by mass. There are no particular restrictions to a solid concentration in a polyamic acid solution (a) as long as it gives a viscosity within a range suitable for production, and in general, it is preferably 10% by mass to 30% by mass, more preferably 15% by mass to 27% by mass, further preferably 18% by mass to 26% by mass.

The conditions such as a temperature during producing a self-supporting film, a support and the like are as described for production of a single-layer type film.

Next, there will be described the case where a self-supporting film is produced by coating method {for (II-1) and (II-2)}.

First, self-supporting film (b) is formed from a polyamic acid (b) solution alone. The production conditions are as described above for multilayer coextrusion except that a polyamic acid (b) solution alone is extruded. To both sides of self-supporting film (b) thus obtained, a polyamic acid (a) solution is applied.

A polyamic acid (a) solution can have any rotational viscosity (a solution viscosity determined by a rotating viscometer at a measurement temperature of 25° C.) as long as it allows for applying the solution to a self-supporting film, and it is preferably 0.5 to 50000 centipoise (mPa·s). A solid concentration in polymer solution (a) is preferably 1 to 15% by mass, more preferably 2 to 8% by mass. In polymerization, monomer concentrations can be adjusted to give such a solid concentration before reaction, or a polymerization solution with a high solid concentration can be appropriately diluted before use.

An coating amount of a polyamic acid (a) solution can be appropriately determined. Particularly preferably, it is determined such that a preferred thickness of polyimide layer (a) as described above is achieved.

A polyamic acid (a) solution can be applied to self-supporting film (b) by a known method such as gravure coating method, spin coating method, silk screen printing method, dip coating method, spray coating method, bar coating method, knife coating method, roll coating method, blade coating method and die coating method.

A liquid film thus formed by application is dried, for example, at 50° C. to 180° C. to form a self-supporting film having a multilayer structure. A preferable weight-loss-after-heating and an imidization rate of a self-supporting film having a multilayer structure are within the same ranges as those described for a single-layer type film.

<Heating (Imidization) Step>

The self-supporting film having a multilayer structure thus formed is heated as described for a single-layer type film, to give a polyimide film. The subsequent processes can be conducted in a similar manner.

<<Polyimide-Metal Laminate>>

Metal layers are laminated by thermal compression-bonding on both sides of the polyimide film having polyimide layer (a) at least in its surface formed as described above.

<Metal Layer>

A metal foil is suitably used as a metal layer. Examples of a metal foil include, but not limited to, metals including copper and copper alloys such as an electrolytic copper foil and a rolled copper foil, aluminum and aluminum alloys, stainless steel, nickel and nickel alloys (42 alloy and the like). A thickness of the metal foil is preferably, but not limited to, 1 to 100 µm, more preferably 2 to 50 µm, more preferably 3 to 35 µm, further preferably 6 to 25 µm, particularly preferably 8 to 20 µm. Furthermore, a surface roughness (Rz) of a metal foil is preferably 0.1 to 10 µm, more preferably 0.1 to 7 µm, further preferably 0.1 to 5 µm, particularly preferably 0.5 to 5 µm. A metal foil is particularly preferably copper or a copper alloy such as electrolytic copper foil and rolled copper foil. Examples of such copper foils include 3EC-III and 3EC-VLP, both of which are available from Mitsui Mining & Smelting Co., Ltd.

When a thin metal foil (for example, a thickness of 1 to 8 µm, preferably 2 to 8 µm) is used, a metal foil on which a protective foil (for example, a carrier foil) is laminated for reinforcing and protecting the metal foil can be used. There are no particular restrictions to a material for a protective foil (carrier foil) as long as it can be laminated with a metal foil such as an ultrathin copper foil and can reinforce and protect it; examples of which include an aluminum foil, a copper foil and a resin foil whose surface is metal-coated. There are no particular restrictions to a thickness of a protective foil (carrier foil) as long as the foil can reinforce a thin metal foil, and it is preferably 10 to 200 µm, further preferably 12 to 100 µm, particularly preferably 15 to 75 µm.

A protective foil (carrier foil) can have any form as long as it is planarly laminated with an ultrathin metal foil such as an ultrathin copper foil.

A protective foil (carrier foil) travels through a continuous process in a state that it is laminated with a metal foil such as an ultrathin copper foil, during which the lamination structure with a metal foil is kept at least until the production of a metal-foil laminated polyimide resin substrate is completed, for facilitating handling.

A protective foil (carrier foil) can be removed from a metal foil such as copper foil, by (1) peeling the protective foil (carrier foil) after laminating a metal foil having a protective foil (carrier foil) on a polyimide film, or (2) etching off the protective foil (carrier foil) after laminating a metal foil having a protective foil (carrier foil) on a polyimide film.

For an electrolytic copper foil having a carrier foil, since a copper component to be an electrolytic copper foil is electrodeposited on the surface of the carrier foil, and therefore, the carrier foil must have at least electrically conductivity.

<Lamination of a Metal Layer and a Polyimide Film>

Next, metal foils as a metal layer are directly laminated on both sides of the polyimide film without intervening an adhesive between them. The metal foils laminated on both sides of the polyimide film can be the same or different. For laminating a metal foil with a thermally fusion-bondable polyimide film, a heating machine, a compression machine or a heating/compression machine can be used. Preferably, the heating and the compression conditions are properly chosen as long as the lamination can be conducted continuously or batch-wise, and preferably the process is continuously conducted using, for example, a roll laminating machine or a double-belt press. A bonding surface of a metal foil and/or the surface of a polyimide film may be surface-treated by, for example, applying a silane coupling agent.

As one aspect of a process for industrially producing a polyimide-metal laminate, the following process can be described. Specifically, a long polyimide film, both sides of which have thermally fusion-bondability, and metal foils are piled such that both sides of the polyimide film are in contact with the metal foils, and they are preferably pre-heated using a pre-heating device such as a hot-air supply device and an infrared heater capable of pre-heating at about 150 to 250° C., particularly higher than 150° C. and 250° C. or lower for about 2 to 120 sec in line immediately before introduction. A pair of fusion-bonding rolls or a double-belt press is used for thermal fusion-bonding under pressure at a temperature of a thermal fusion-bonding zone in the pair of fusion-bonding rolls or the double-belt press which is within the range of a temperature higher than a glass-transition temperature of a thermally fusion-bondable polyimide by 20° C. or more, by further 30° C. or more to 400° C. or lower, particularly the range of a temperature higher than a glass-transition temperature by 50° C. or more to 400° C. A temperature of a thermal fusion-bonding zone is within the range of for example 280 to 370° C., preferably 300 to 370° C. Particularly, for a double-belt press, the product is subsequently cooled under pressure in a cooling zone. Suitably, it is cooled to a temperature lower than a glass-transition temperature of the thermally fusion-bondable polyimide by 20° C. or more, further 30° C. or more to 110° C., preferably up to 115° C., further preferably up to 120° C., then laminated and winded as a roll. Thus, there is provided a polyimide-metal laminate in which metal foils are laminated directly on both sides of the polyimide film. In the present invention, the polyimide film can be thermally fusion-bonded to metal layers at a relatively lower temperature. Although the reason is not clearly understood, it would be because a diamine compound represented by general formula (1) is used as a diamine component.

Pre-heating of a polyimide film before thermal compression-bonding is preferable because it can reduce appearance defects due to foaming of a laminate after thermal compression-bonding, caused by moisture contained in the polyimide.

A preferable double-belt press is that which can conduct high-temperature heating/cooling under pressure and a hydrostatic type using heat carrier is preferable.

In the production of polyimide-metal laminate, lamination is carried out preferably at a drawing rate of 1 m/min or more by thermal fusion-bonding and cooling under pressure using a double-belt press. Thus obtained laminate is continuously long and has a width of about 400 mm or more, particularly about 500 mm or more, and high adhesive strength, and further has good appearance so that substantially no wrinkles are observed. Furthermore, since a linear thermal expansion coefficient of the polyimide film is close to that of the metal foil, warpage of a polyimide-metal laminate can be reduced.

In producing a polyimide-metal laminate, protective layers (that is, two protective-material layers) can intervene between both outermost layers and belts, and then these can be laminated by bonding by thermally fusion bonding-cooling under pressure.

There are no particular restrictions to a material for a protective layer as long as it is not thermally fusion-bondable to polyimide layer (a) or metal foil during producing a laminate and exhibits good surface smoothness; particularly suitable examples include metal foils, in particular a copper foil, a stainless steel foil, an aluminum foil and a high heat-resistant polyimide film (for example, Upilex®-S from Ube Industries Ltd., Kapton®-H from DuPont-Toray Co. Ltd.) which have a thickness of about 5 to 125 μm, particularly preferably Upilex®-S from Ube Industries Ltd.

A polyimide-metal laminate thus obtained can be used as a material for electronic components and an electronic devices including a printed-wiring board, a flexible printed board, a TAB tape, a COF tape or a metal interconnection, or a cover substrate for a metal interconnection and a chip member such as an IC chip and a base substrate for a liquid crystal display, an organic electroluminescence display, an electronic paper, a solar battery and so on.

EXAMPLES

The present invention will be further explained in details with reference to examples, but the present invention is by no means limited to these examples.

(Evaluation Methods for the Physical Properties of a Polyimide Film)

The physical properties of a polyimide film were evaluated as follows.

a) Peel strength of a polyimide-metal laminate was peel strength in T-peel test, which was measured at a peel rate of 50 mm/min under the environment at temperature of 23° C. and relative humidity of 50%. This was recorded as an "initial peel strength". A test piece required for measuring peel strength in the T-peel test was prepared as described below. A polyimide-metal laminate was cut as strips with a width of 5 mm and a length of 150 mm, to give 5 test pieces. In the T-peel test, peel strength was measured according the following procedure: each of copper foils in both sides of one end of the test piece of the polyimide-metal laminate was gripped by a chuck, and one copper foil was pulled in a direction completely opposite to that of the other copper foil to peel the adhesion interface of the copper foil from the polyimide film. Such measurement was conducted for the same test piece from each end to a half length in a longitudinal direction. The measurement procedure was conducted for five test pieces to obtain 10 measured values in total, from which an average was calculated to give peel strength values shown in Tables 1 to 3 of the present application. In peeling of a copper foil from a polyimide film, peeling occurs in a interface with weaker adhesion force in the copper foils laminated on both sides of polyimide film. Thus, the measured peel strength is that of a interface with a weaker adhesion force.

b) A polyimide-metal laminate was placed in a hot-air drier at 150° C. for 24 hours, and then its peel strength was measured and recorded as a "post-heating peel strength". The method for measuring peel strength was as described in a).

(Preparation of Polyamic Acid Solution a) s-BPDA-ATDA

In a polymerization vessel were charged predetermined amounts of N,N-dimethylacetamide (DMAc) and 2,4-bis(4-aminoanilino)-6-anilino-1,3,5-triazine (ATDA) as a diamine component. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution A.

(Preparation of Polyamic Acid Solution B) s-BPDA-PPD-ATDA

In a polymerization vessel were charged predetermined amounts of N,N-dimethylacetamide (DMAc) and para-phenylenediamine (PPD) and 2,4-bis(4-aminoanilino)-6-anilino-1,3,5-triazine (ATDA) as diamine component. The amount of ATDA was 70 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution B.

(Preparation of Polyamic Acid Solution C) s-BPDA-PMDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 80 mol % based on the total diamine components. Then, to the mixture, 3,3',4,4'-biphenyltetracarboxylic dianhydride (s-BPDA) and pyromellitic dianhydride (PMDA) as tetracarboxylic acid component were added stepwise with stirring at 40° C. to an almost equal molar amount to the total diamine components to initiate a reaction, giving a polyamic-acid polymerization solution (polyimide precursor solution) with a solid concentration of 18% by mass. The amount of s-BPDA was 50 mol % based on the total acid dianhydride component. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution C.

(Preparation of Amic Acid Solution D) s-BPDA-PPD

In a polymerization vessel were charged predetermined amounts of N,N-dimethylacetamide (DMAc) and para-phenylenediamine (PPD) as diamine component. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine component to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution D.

(Preparation of Polyamic Acid Solution E) s-BPDA-PPD-ATDA

In a polymerization vessel were charged predetermined amounts of N,N-dimethylacetamide (DMAc) and para-phenylenediamine (PPD) and 2,4-bis(4-aminoanilino)-6-anilino-1,3,5-triazine (ATDA) as diamine component. The amount of ATDA was 50 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution E.

(Preparation of Polyamic Acid Solution F) s-BPDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 50 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution F.

(Preparation of Polyamic Acid Solution G) s-BPDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 20 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution G.

(Preparation of Polyamic Acid Solution H) s-BPDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 5 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution H.

(Preparation of Polyamic Acid Solution I) s-BPDA-PPD

In a polymerization vessel were charged predetermined amounts of N,N-dimethylacetamide (DMAc) and 4,4'-diaminodiphenyl ether (DADE) as diamine component. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution I.

(Preparation of Polyamic Acid Solution J) s-BPDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 10 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution J.

(Preparation of Polyamic Acid Solution K) s-BPDA-DADE-PPD-ATDA

In a polymerization vessel were charged predetermined amounts of N,N-dimethylacetamide (DMAc) and 4,4'-diaminodiphenyl ether (DADE), para-phenylenediamine (PPD) and 2,4-bis(4-aminoanilino)-6-anilino-1,3,5-triazine (ATDA) as diamine component. The amount of DADE was 40 mol %, that of PPD was 40 mol % and that of ATDA was 20 mol % based on the total diamine components. Then, to the mixture, 3,3',4,4'-biphenyltetracarboxylic dianhydride (s-BPDA) as a tetracarboxylic acid component was added stepwise with stirring at 40° C. to an almost equal molar amount to the total diamine components to initiate a reaction, giving a polyamic-acid polymerization solution (polyimide precursor solution) with a solid concentration of 18% by mass. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution K.

(Preparation of Polyamic Acid Solution L) s-BPDA-PMDA-DADE-ATDA

In a polymerization vessel were charged predetermined amounts of N,N-dimethylacetamide (DMAc) and 4,4'-diaminodiphenyl ether (DADE) and 2,4-bis(4-aminoanilino)-6-anilino-1,3,5-triazine (ATDA) as diamine component. The amount of ATDA was 10 mol % based on the total diamine components. Then, to the mixture, 3,3',4,4'-biphenyltetracarboxylic dianhydride (s-BPDA) and pyromellitic dianhydride (PMDA) as a tetracarboxylic acid component were added stepwise with stirring at 40° C. to an almost equal molar amount to the total diamine components to initiate a reaction, giving a polyamic-acid polymerization solution (polyimide precursor solution) with a solid concentration of 18% by mass. The amount of s-BPDA was 50 mol % based on the total acid dianhydride component. Then, to this polyamic-acid polymerization solution, monostearyl phosphate triethanolamine salt was added in a proportion of 0.25 parts by mass based on 100 parts by mass of the polyamic acid, and the mixture was homogeneously mixed to give polyamic acid solution L.

Example 1

A polyamic-acid solution A was cast as a thin film on a glass plate, and heated by a hot plate at 138° C. for 435 sec. The film was peeled from the glass plate to give a self-supporting film.

This self-supporting film was fixed at four sides with pin tenters and heated for imidization in an oven continuously from 150° C. to 320° C. (the maximum heating temperature is 320° C.) for 9 min, to produce a polyimide film having a thickness of 50 μm (PI-1).

Then, on the both surface of the polyimide film (PI-1), copper foils (3EC-III, 35 μm, available from Mitsui Mining & Smelting Co., Ltd.) were laminated by pressing under the condition of 320° C. and 4 MPa to produce a polyimide-metal laminate (PI-1). The condition of the thermal compression-bonding is shown in Table 1. The peel strength of the polyimide-metal laminate (PI-1) was measured and the result was shown in Table 1.

Example 2

A self-supporting film was obtained in similar manner as described in Example 1. This self-supporting film was fixed at four sides with pin tenters and heated for imidization in an oven continuously from 150° C. to 340° C. for 10 min, to produce a polyimide film having a thickness of 50 μm (PI-2). Using the polyimide film (PI-2), a polyimide-metal laminate (PI-2) having copper foils laminated on both surfaces thereof was obtained in a similar manner as described in Example 1. The peel strength of the polyimide-metal laminate (PI-2) was measured and the result was shown in Table 1.

Example 3

A self-supporting film was obtained in similar manner as described in Example 1. This self-supporting film was fixed at four sides with pin tenters and heated for imidization in an oven continuously from 150° C. to 350° C. for 10 min, to produce a polyimide film having a thickness of 50 μm (PI-3). Using the polyimide film (PI-3), a polyimide-metal laminate (PI-3) having copper foils laminated on both surfaces thereof was obtained in a similar manner as described in Example 1. The peel strength of the polyimide-metal laminate (PI-3) was measured and the result was shown in Table 1.

Example 4

Using the polyimide film (PI-3), a polyimide-metal laminate (PI-4) having copper foils laminated on both surfaces thereof was obtained in a similar manner as described in Example 3 except that the temperature of thermal compression-bonding was changed to 300° C. The peel strength of the polyimide-metal laminate (PI-4) was measured and the result was shown in Table 1.

Example 5

A self-supporting film was obtained in similar manner as described in Example 1.

This self-supporting film was fixed at four sides with pin tenters and heated for imidization in an oven continuously from 150° C. to 370° C. for 11 min, to produce a polyimide film having a thickness of 50 μm (PI-5). Using the polyimide film (PI-5), a polyimide-metal laminate (PI-5) having copper foils laminated on both surfaces thereof was obtained in a similar manner as described in Example 1. The peel strength of the polyimide-metal laminate (PI-5) was measured and the result was shown in Table 1.

Example 6

A polyamic-acid solution A was cast as a thin film on a glass plate, and heated by a hot plate at 138° C. for 210 sec to give a self-supporting film. Without peeling off the self-supporting film from the glass plate, it was heated for imidization continuously from 150° C. to 370° C. for 11 min on the glass plate. After cooling, it was immersed in water, thereby peeling off the polyimide film from the glass plate. After drying, a polyimide film having a thickness of 12.5 μm (PI-6) was obtained. Using the polyimide film (PI-6), a polyimide-metal laminate (PI-6) having copper foils laminated on both surfaces thereof was obtained in a similar manner as described in Example 1 except that the temperature and the period of thermal compression-bonding were changed to 370° C. and 30 min, respectively. The peel strength of the polyimide-metal laminate (PI-6) was measured and the result was shown in Table 1.

Example 7

A polyamic-acid solution A was cast as a thin film on a glass plate, and heated by a hot plate at 138° C. for 210 sec. The film was peeled from the glass plate to give a self-supporting film. This self-supporting film was fixed at four sides with pin tenters and heated for imidization in an oven continuously from 150° C. to 370° C. for 11 min, to produce a polyimide film having a thickness of 35 µm (PI-7). A polyimide-metal laminate (PI-7) having copper foils laminated on both surfaces thereof was obtained in a similar manner as described in Example 6 except that the polyimide film (PI-7) was used. The peel strength of the polyimide-metal laminate (PI-7) was measured and the result was shown in Table 1.

Example 8

A polyamic-acid solution A was cast as a thin film on a glass plate, and heated by a hot plate at 138° C. for 270 sec. The film was peeled from the glass plate to give a self-supporting film. This self-supporting film was fixed at four sides with pin tenters and heated for imidization in an oven continuously from 150° C. to 370° C. for 11 min, to produce a polyimide film having a thickness of 50 µm (PI-8). A polyimide-metal laminate (PI-8) having copper foils laminated on both surfaces thereof was obtained in a similar manner as described in Example 6 except that the polyimide film (PI-8) was used. The peel strength of the polyimide-metal laminate (PI-8) was measured and the result was shown in Table 1.

Example 9

A polyamic-acid solution B was cast as a thin film on a glass plate, and heated by a hot plate at 138° C. for 375 sec. The film was peeled from the glass plate to give a self-supporting film. This self-supporting film was fixed at four sides with pin tenters and heated for imidization in an oven continuously from 150° C. to 370° C. for 11 min, to produce a polyimide film having a thickness of 50 µm (PI-9). Using the polyimide film (PI-9), a polyimide-metal laminate (PI-9) having copper foils laminated on both surfaces thereof was obtained in a similar manner as described in Example 1. The peel strength of the polyimide-metal laminate (PI-9) was measured and the result was shown in Table 1.

Example 10

A polyamic-acid solution C was cast as a thin film on a glass plate, and heated by a hot plate at 138° C. for 435 sec. The film was peeled from the glass plate to give a self-supporting film. This self-supporting film was fixed at four sides with pin tenters and heated for imidization in an oven continuously from 150° C. to 370° C. for 11 min, to produce a polyimide film having a thickness of 50 µm (PI-10). Using the polyimide film (PI-10), a polyimide-metal laminate (PI-10) having copper foils laminated on both surfaces thereof was obtained in a similar manner as described in Example 1. The peel strength of the polyimide-metal laminate (PI-10) was measured and the result was shown in Table 1.

Example 11

A self-supporting film was obtained in similar manner as described in Example 1. This self-supporting film was fixed at four sides with pin tenters and heated for imidization in an oven continuously from 150° C. to 400° C. for 12 min, to produce a polyimide film having a thickness of 50 µm (PI-11). Using the polyimide film (PI-11), a polyimide-metal laminate (PI-11) having copper foils laminated on both surfaces thereof was obtained in a similar manner as described in Example 1. The peel strength of the polyimide-metal laminate (PI-11) was measured and the result was shown in Table 1.

Comparative Example 1

A self-supporting film was obtained in similar manner as described in Example 1. This self-supporting film was fixed at four sides with pin tenters and heated for imidization in an oven continuously from 150° C. to 450° C. for 16 min, to produce a polyimide film having a thickness of 50 µm (PI-12). Using the polyimide film (PI-12), a polyimide-metal laminate (PI-12) having copper foils laminated on both surfaces thereof was obtained in a similar manner as described in Example 1. The peel strength of the polyimide-metal laminate (PI-12) was measured and the result was shown in Table 1.

Comparative Example 2

A self-supporting film was obtained in similar manner as described in Example 6. Without peeling off the self-supporting film from the glass plate, it was heated for imidization continuously from 150° C. to 490° C. for 18 min on the glass plate. After cooling, it was immersed in water, thereby peeling off the polyimide film from the glass plate. After drying, a polyimide film having a thickness of 12.5 µm (PI-13) was obtained. Using the polyimide film (PI-13), a polyimide-metal laminate (PI-13) having copper foils laminated on both surfaces thereof was obtained in a similar manner as described in Example 6. The peel strength of the polyimide-metal laminate (PI-13) was measured and the result was shown in Table 1.

Comparative Example 3

A self-supporting film was obtained in similar manner as described in Example 7. This self-supporting film was fixed at four sides with pin tenters and heated for imidization in an oven continuously from 150° C. to 490° C. for 18 min, to produce a polyimide film having a thickness of 35 µm (PI-14). Using the polyimide film (PI-14), a polyimide-metal laminate (PI-14) having copper foils laminated on both surfaces thereof was obtained in a similar manner as described in Example 6. The peel strength of the polyimide-metal laminate (PI-14) was measured and the result was shown in Table 1.

Comparative Example 4

A self-supporting film was obtained in similar manner as described in Example 8. This self-supporting film was fixed at four sides with pin tenters and heated for imidization in an oven continuously from 150° C. to 490° C. for 18 min, to produce a polyimide film having a thickness of 50 on (PI-15). Using the polyimide film (PI-15), a polyimide-metal laminate (PI-15) having copper foils laminated on both surfaces thereof was obtained in a similar manner as described in Example 6. The peel strength of the polyimide-metal laminate (PI-15) was measured and the result was shown in Table 1.

Comparative Example 5

A polyimide film having a thickness of 50 μm (PI-16) was obtained in similar manner as described in Comparative Example 4 except that polyamic acid solution was changed to D. Using the polyimide film (PI-16), a polyimide-metal laminate (PI-16) having copper foils laminated on both surfaces thereof was obtained in a similar manner as described in Example 6. The peel strength of the polyimide-metal laminate (PI-16) was very low and was unable to measure. The result was shown in Table 1.

Comparative Example 6

A polyimide film having a thickness of 50 μm (PI-17) was obtained in similar manner as described in Example 5 except that polyamic acid solution was changed to D. Using the polyimide film (PI-17), a polyimide-metal laminate (PI-17) having copper foils laminated on both surfaces thereof was obtained in a similar manner as described in Example 1. The peel strength of the polyimide-metal laminate (PI-17) was very low and was unable to measure. The result was shown in Table 1.

Example 12

Using the polyimide film (PI-2), a polyimide-metal laminate (PI-18) having copper foils laminated on both surfaces thereof was obtained in a similar manner as described in Example 2 except that the temperature of thermal compression-bonding was changed to 340° C. The peel strength of the polyimide-metal laminate (PI-18) was measured and the result was shown in Table 2.

Example 13

Using the polyimide film (PI-2), a polyimide-metal laminate (PI-19) having copper foils laminated on both surfaces thereof was obtained in a similar manner as described in Example 2 except that the temperature of thermal compression-bonding was changed to 350° C. The peel strength of the polyimide-metal laminate (PI-19) was measured and the result was shown in Table 2.

Example 14

A self-supporting film was obtained in similar manner as described in Example 9. This self-supporting film was fixed at four sides with pin tenters and heated for imidization in an oven continuously from 150° C. to 350° C. for 10 min, to produce a polyimide film having a thickness of 50 μm (PI-20). Using the polyimide film (PI-20), a polyimide-metal laminate (PI-20) having copper foils laminated on both surfaces thereof was obtained in a similar manner as described in Example 9. The peel strength of the polyimide-metal laminate (PI-20) was measured and the result was shown in Table 2.

Example 15

A self-supporting film was obtained in similar manner as described in Example 1. This self-supporting film was fixed at four sides with pin tenters and heated for imidization in an oven continuously from 150° C. to 420° C. for 14 min, to produce a polyimide film having a thickness of 50 μm (PI-21). Using the polyimide film (PI-21), a polyimide-metal laminate (PI-21) having copper foils laminated on both surfaces thereof was obtained in a similar manner as described in Example 1. The peel strength of the polyimide-metal laminate (PI-21) was measured and the result was shown in Table 2.

Example 16

A self-supporting film was obtained in similar manner as described in Example 1. This self-supporting film was fixed at four sides with pin tenters and heated for imidization in an oven continuously from 150° C. to 430° C. for 14 min, to produce a polyimide film having a thickness of 50 μm (PI-22). Using the polyimide film (PI-22), a polyimide-metal laminate (PI-22) having copper foils laminated on both surfaces thereof was obtained in a similar manner as described in Example 1. The peel strength of the polyimide-metal laminate (PI-22) was measured and the result was shown in Table 2.

Example 17

A self-supporting film was obtained in similar manner as described in Example 1. This self-supporting film was fixed at four sides with pin tenters and heated for imidization in an oven continuously from 150° C. to 440° C. for 14 min, to produce a polyimide film having a thickness of 50 μm (PI-23). Using the polyimide film (PI-23), a polyimide-metal laminate (PI-23) having copper foils laminated on both surfaces thereof was obtained in a similar manner as described in Example 1. The peel strength of the polyimide-metal laminate (PI-23) was measured and the result was shown in Table 2.

Example 18

Using the polyimide film (PI-2), a polyimide-metal laminate (PI-24) having copper foils laminated on both surfaces thereof was obtained in a similar manner as described in Example 2 except that the copper foils were changed to 3EC-VLP (thickness: 18 μm) available from Mitsui Mining & Smelting Co., Ltd. and the temperature of thermal compression-bonding was changed to 280° C. The peel strength of the polyimide-metal laminate (PI-24) was measured and the result was shown in Table 3.

Example 19

Using the polyimide film (PI-2), a polyimide-metal laminate (PI-25) having copper foils laminated on both surfaces thereof was obtained in a similar manner as described in Example 2 except that the copper foils were changed to 3EC-VLP (thickness: 18 μm) available from Mitsui Mining & Smelting Co., Ltd. and the temperature of thermal compression-bonding was changed to 300° C. The peel strength of the polyimide-metal laminate (PI-25) was measured and the result was shown in Table 3.

Example 20

Using the polyimide film (PI-2), a polyimide-metal laminate (PI-26) having copper foils laminated on both surfaces thereof was obtained in a similar manner as described in Example 2 except that the copper foils were changed to 3EC-VLP (thickness: 18 μm) available from Mitsui Mining & Smelting Co., Ltd. The peel strength of the polyimide-metal laminate (PI-26) was measured and the result was shown in Table 3.

Example 21

Using the polyimide film (PI-2), a polyimide-metal laminate (PI-27) having copper foils laminated on both surfaces thereof was obtained in a similar manner as described in Example 2 except that the copper foils were changed to 3EC-VLP (thickness: 18 μm) available from Mitsui Mining & Smelting Co., Ltd. and the temperature of thermal compression-bonding was changed to 340° C. The peel strength of the polyimide-metal laminate (PI-27) was measured and the result was shown in Table 3.

Example 22

Using the polyimide film (PI-2), a polyimide-metal laminate (PI-28) having copper foils laminated on both surfaces thereof was obtained in a similar manner as described in Example 2 except that the copper foils were changed to 3EC-VLP (thickness: 18 μm) available from Mitsui Mining & Smelting Co., Ltd. and the temperature of thermal compression-bonding was changed to 350° C. The peel strength of the polyimide-metal laminate (PI-28) was measured and the result was shown in Table 3.

Example 23

Using the polyimide film (PI-5), a polyimide-metal laminate (PI-29) having copper foils laminated on both surfaces thereof was obtained in a similar manner as described in Example 5 except that the copper foils were changed to 3EC-VLP (thickness: 18 μm) available from Mitsui Mining & Smelting Co., Ltd. The peel strength of the polyimide-metal laminate (PI-29) was measured and the result was shown in Table 3.

Example 24

Using the polyimide film (PI-20), a polyimide-metal laminate (PI-30) having copper foils laminated on both surfaces thereof was obtained in a similar manner as described in Example 14 except that the copper foils were changed to 3EC-VLP (thickness: 18 μm) available from Mitsui Mining & Smelting Co., Ltd. The peel strength of the polyimide-metal laminate (PI-30) was measured and the result was shown in Table 3.

Example 25

Using the polyimide film (PI-9), a polyimide-metal laminate (PI-31) having copper foils laminated on both surfaces thereof was obtained in a similar manner as described in Example 9 except that the copper foils were changed to 3EC-VLP (thickness: 18 μm) available from Mitsui Mining & Smelting Co., Ltd. The peel strength of the polyimide-metal laminate (PI-31) was measured and the result was shown in Table 3.

Example 26

A polyamic-acid solution E was cast as a thin film on a glass plate, and heated by a hot plate at 138° C. for 370 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-32). Using the polyimide film (PI-32), a polyimide-metal laminate (PI-32) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-32) was measured and the result was shown in Table 3.

Example 27

A self-supporting film was obtained in similar manner as described in Example 26. This self-supporting film was fixed at four sides with pin tenters and heated for imidization in an oven continuously from 150° C. to 370° C. for 11 min, to produce a polyimide film having a thickness of 50 μm (PI-33). Using the polyimide film (PI-33), a polyimide-metal laminate (PI-33) having copper foils laminated on both surfaces thereof was obtained in a similar manner as described in Example 26. The peel strength of the polyimide-metal laminate (PI-33) was measured and the result was shown in Table 3.

Example 28

Using the polyimide film (PI-33), a polyimide-metal laminate (PI-34) having copper foils laminated on both surfaces thereof was obtained in a similar manner as described in Example 27 except that the temperature of thermal compression-bonding was changed to 350° C. The peel strength of the polyimide-metal laminate (PI-34) was measured and the result was shown in Table 3.

Example 29

A polyamic-acid solution F was cast as a thin film on a glass plate, and heated by a hot plate at 138° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-35). Using the polyimide film (PI-35), a polyimide-metal laminate (PI-35) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-35) was measured and the result was shown in Table 3.

Example 30

A polyamic-acid solution G was cast as a thin film on a glass plate, and heated by a hot plate at 138° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-36). Using the polyimide film (PI-36), a polyimide-metal laminate (PI-36) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-36) was measured and the result was shown in Table 3.

Example 31

A polyamic-acid solution H was cast as a thin film on a glass plate, and heated by a hot plate at 138° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-37). Using the polyimide film (PI-37), a polyimide-metal laminate (PI-37) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-37) was measured and the result was shown in Table 3.

Comparative Example 7

Using the polyimide film (PI-17), a polyimide-metal laminate (PI-38) having copper foils laminated on both surfaces thereof was obtained in a similar manner as described in Comparative Example 6 except that the copper foils were changed to 3EC-VLP (thickness: 18 μm) available from Mitsui Mining & Smelting Co., Ltd. The peel strength of the polyimide-metal laminate (PI-38) was low. The result was shown in Table 3.

Comparative Example 8

A polyamic-acid solution I was cast as a thin film on a glass plate, and heated by a hot plate at 138° C. for 360 sec. The film was peeled from the glass plate to give a self-supporting film. This self-supporting film was fixed at four sides with pin tenters and heated for imidization in an oven continuously from 150° C. to 370° C. for 11 min, to produce a polyimide film having a thickness of 50 μm (PI-39). Using the polyimide film (PI-39), a polyimide-metal laminate (PI-39) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-39) was measured and the result was shown in Table 3.

Example 32

A polyamic-acid solution J was cast as a thin film on a glass plate, and heated by a hot plate at 130° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-40). Using the polyimide film (PI-40), a polyimide-metal laminate (PI-40) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-40) was measured and the result was shown in Table 4.

Example 33

A polyamic-acid solution K was cast as a thin film on a glass plate, and heated by a hot plate at 130° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-41). Using the polyimide film (PI-41), a polyimide-metal laminate (PI-41) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-41) was measured and the result was shown in Table 4.

Example 34

A polyamic-acid solution L was cast as a thin film on a glass plate, and heated by a hot plate at 130° C. for 360 sec. The film was peeled from the glass plate to give a self-supporting film. This self-supporting film was fixed at four sides with pin tenters and heated for imidization in an oven continuously from 150° C. to 350° C. for 10 min, to produce a polyimide film having a thickness of 50 μm (PI-42). Using the polyimide film (PI-42), a polyimide-metal laminate (PI-42) having copper foils laminated on both surfaces thereof was obtained in a similar manner as described in Example 1 except that the copper foils were changed to 3EC-VLP (thickness: 18 μm) available from Mitsui Mining & Smelting Co., Ltd. The peel strength of the polyimide-metal laminate (PI-42) was measured and the result was shown in Table 4.

From the Examples and Comparative Examples, mainly the following findings have become clear.

(1) Polyimide films formed by thermal imidization (curing) at a maximum heating temperature of 440° C. or lower, preferably 400° C. or lower in the heating process (imidization process) have particularly high initial peel strength and post-heating peel strength in comparison with those formed by curing at a temperature higher than 450° C.

(2) In Examples 1 to 11, the post-heating peel strength is almost equal to or larger than the initial peel strength.

(3) Example 10 which uses PMDA as an acid component has larger initial peel strength than Example 5 which does not use PMDA.

(4) The cases in which p-ATDA is not used as the diamine component do not have thermally fusion-bondability.

(5) Example 29 which uses DADE in a proportion of 50 mol % as a diamine has larger initial peel strength than Example 26 which uses PPD in a proportion of 50 mol % as a diamine.

(6) Example 30 which uses DADE in a proportion of 80 mol % and p-ATDA in a proportion of 20 mol % as diamines has very large initial peel strength of 1.19 kN/m. Whereas, Comparative Example 8 which uses DADE only as diamine component does not have thermally fusion-bondability. From these facts, it is found that when DADE and p-ATDA are used as diamine component, even a small amount of p-ATDA in the diamine component gives high adhesiveness.

(7) Example 33 which uses DADE in a proportion of 40 mol %, PPD in a proportion of 40 mol % and of p-ATDA in a proportion of 20 mol % as diamines has very large initial peel strength of 1.40 kN/m. From this fact, it is found that when DADE, PPD and p-ATDA are used in combination as diamine component, it gives higher adhesiveness compared with the case which uses PPD and ATDA only as diamine component.

TABLE 1

| | Acid component | | Diamine component | | | Maximum heating temperature °C. | Thermal compression-bonding condition | | Polyimide-metal laminate | | Peel strength of polyimide-metal laminate | |
|---|---|---|---|---|---|---|---|---|---|---|---|---|
| | s-BPDA mol % | PMDA | ATDA mol % | PPD | DADE | | temp. °C. | time min. | Identity | thickness μm | initial | post heating kN/m |
| Example 1 | 100 | 0 | 100 | 0 | 0 | 320 | 320 | 10 | PI-1 | 50 | 0.40 | 1.22 |
| Example 2 | 100 | 0 | 100 | 0 | 0 | 340 | 320 | 10 | PI-2 | 50 | 0.44 | 0.78 |
| Example 3 | 100 | 0 | 100 | 0 | 0 | 350 | 320 | 10 | PI-3 | 50 | 0.63 | 0.79 |
| Example 4 | 100 | 0 | 100 | 0 | 0 | 350 | 300 | 10 | PI-4 | 50 | 0.60 | 0.51 |
| Example 5 | 100 | 0 | 100 | 0 | 0 | 370 | 320 | 10 | PI-5 | 50 | 0.51 | 0.88 |
| Example 6 | 100 | 0 | 100 | 0 | 0 | 370 | 370 | 30 | PI-6 | 12.5 | 0.85 | 1.16 |
| Example 7 | 100 | 0 | 100 | 0 | 0 | 370 | 370 | 30 | PI-7 | 35 | 1.32 | 1.40 |
| Example 8 | 100 | 0 | 100 | 0 | 0 | 370 | 370 | 30 | PI-8 | 50 | 1.02 | 1.22 |
| Example 9 | 100 | 0 | 70 | 30 | 0 | 370 | 320 | 10 | PI-9 | 50 | 0.56 | 0.58 |
| Example 10 | 50 | 50 | 80 | 0 | 20 | 370 | 320 | 10 | PI-10 | 50 | 0.74 | 0.67 |
| Example 11 | 100 | 0 | 100 | 0 | 0 | 400 | 320 | 10 | PI-11 | 50 | 0.38 | 0.61 |
| Comp. Ex 1 | 100 | 0 | 100 | 0 | 0 | 450 | 320 | 10 | PI-12 | 50 | 0.14 | 0.38 |
| Comp. Ex 2 | 100 | 0 | 100 | 0 | 0 | 490 | 370 | 30 | PI-13 | 12.5 | 0.03 | 0.03 |
| Comp. Ex 3 | 100 | 0 | 100 | 0 | 0 | 490 | 370 | 30 | PI-14 | 35 | 0.03 | 0.09 |
| Comp. Ex 4 | 100 | 0 | 100 | 0 | 0 | 490 | 370 | 30 | PI-15 | 50 | 0.13 | 0.35 |
| Comp. Ex 5 | 100 | 0 | 0 | 100 | 0 | 490 | 370 | 30 | PI-16 | 50 | No *1) | — |
| Comp. Ex 6 | 100 | 0 | 0 | 100 | 0 | 370 | 320 | 10 | PI-17 | 50 | No *1) | — |

*1) No adhesion

TABLE 2

| | Acid component | | Diamine component | | | Maximum heating temperature °C. | Thermal compression-bonding condition | | Polyimide-metal laminate | | Peel strength of polyimide-metal laminate |
|---|---|---|---|---|---|---|---|---|---|---|---|
| | s-BPDA mol % | PMDA | ATDA mol % | PPD | DADE | | temp. °C. | time min. | Identity | thickness μm | initial kN/m |
| Example 12 | 100 | 0 | 100 | 0 | 0 | 340 | 340 | 10 | PI-18 | 50 | 0.34 |
| Example 13 | 100 | 0 | 100 | 0 | 0 | 340 | 350 | 10 | PI-19 | 50 | 0.32 |
| Example 14 | 100 | 0 | 70 | 30 | 0 | 350 | 320 | 10 | PI-20 | 50 | 0.31 |
| Example 15 | 100 | 0 | 100 | 0 | 0 | 420 | 320 | 10 | PI-21 | 50 | 0.47 |
| Example 16 | 100 | 0 | 100 | 0 | 0 | 430 | 320 | 10 | PI-22 | 50 | 0.53 |
| Example 17 | 100 | 0 | 100 | 0 | 0 | 440 | 320 | 10 | PI-23 | 50 | 0.35 |

TABLE 3

| | Acid component | | Diamine component | | | Maximum heating temperature °C. | Thermal compression-bonding condition | | Polyimide-metal laminate | | Peel strength of polyimide-metal laminate |
|---|---|---|---|---|---|---|---|---|---|---|---|
| | s-BPDA mol % | PMDA | ATDA mol % | PPD | DADE | | temp. °C. | time min. | Identity | thickness μm | initial kN/m |
| Example 18 | 100 | 0 | 100 | 0 | 0 | 340 | 280 | 10 | PI-24 | 50 | 1.29 |
| Example 19 | 100 | 0 | 100 | 0 | 0 | 340 | 300 | 10 | PI-25 | 50 | 1.32 |
| Example 20 | 100 | 0 | 100 | 0 | 0 | 340 | 320 | 10 | PI-26 | 50 | 1.23 |
| Example 21 | 100 | 0 | 100 | 0 | 0 | 340 | 340 | 10 | PI-27 | 50 | 0.38 |
| Example 22 | 100 | 0 | 100 | 0 | 0 | 340 | 350 | 10 | PI-28 | 50 | 0.40 |
| Example 23 | 100 | 0 | 100 | 0 | 0 | 370 | 320 | 10 | PI-29 | 50 | 1.05 |
| Example 24 | 100 | 0 | 70 | 30 | 0 | 350 | 320 | 10 | PI-30 | 50 | 0.64 |
| Example 25 | 100 | 0 | 70 | 30 | 0 | 370 | 320 | 10 | PI-31 | 50 | 1.11 |
| Example 26 | 100 | 0 | 50 | 50 | 0 | 350 | 320 | 10 | PI-32 | 50 | 0.45 |
| Example 27 | 100 | 0 | 50 | 50 | 0 | 370 | 320 | 10 | PI-33 | 50 | 0.58 |
| Example 28 | 100 | 0 | 50 | 50 | 0 | 370 | 350 | 10 | PI-34 | 50 | 0.32 |
| Example 29 | 100 | 0 | 50 | 0 | 50 | 350 | 320 | 10 | PI-35 | 50 | 1.04 |
| Example 30 | 100 | 0 | 20 | 0 | 80 | 350 | 320 | 10 | PI-36 | 50 | 1.19 |
| Example 31 | 100 | 0 | 5 | 0 | 95 | 350 | 320 | 10 | PI-37 | 50 | 0.56 |
| Comp. Ex 7 | 100 | 0 | 0 | 100 | 0 | 370 | 320 | 10 | PI-38 | 50 | 0.06 |
| Comp. Ex 8 | 100 | 0 | 0 | 0 | 100 | 370 | 320 | 10 | PI-39 | 50 | 0.09 |

TABLE 4

| | Acid component | | Diamine component | | | Maximum heating | Thermal compression-bonding condition | | Polyimide-metal laminate | | Peel strength of polyimide-metal laminate |
|---|---|---|---|---|---|---|---|---|---|---|---|
| | s-BPDA | PMDA | ATDA | PPD | DADE | temperature | temp. | time | | thickness | initial |
| | mol % | | | mol % | | ° C. | ° C. | min. | Identity | μm | kN/m |
| Example 32 | 100 | 0 | 10 | 0 | 90 | 350 | 320 | 10 | PI-40 | 50 | 0.76 |
| Example 33 | 100 | 0 | 20 | 40 | 40 | 350 | 320 | 10 | PI-41 | 50 | 1.40 |
| Example 34 | 50 | 50 | 10 | 0 | 90 | 350 | 320 | 10 | PI-42 | 50 | 0.30 |

The invention claimed is:

1. A method for manufacturing a polyimide-metal laminate, comprising:
forming a polyimide film, in which at least surfaces of both sides of the film are formed by polyimide layers (a), and;
thermal compression-bonding metal layers on both sides of the polyimide film,
wherein forming the polyimide film comprises:
reacting a tetracarboxylic dianhydride component with a diamine component containing a diamine compound represented by general formula (1) to give a solution of a polyamic acid (a),
forming a self-supporting film from the solution of the polyamic acid (a) on a support, and
imidizing the self-supporting film by heating at a maximum heating temperature of 440° C. or lower after the self-supporting film is peeled from the support to form the polyimide layer (a);

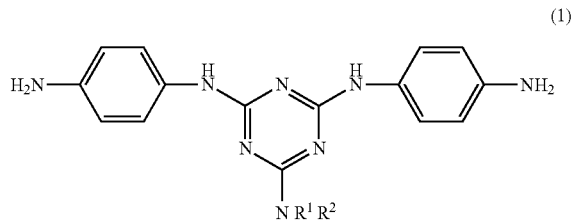

(1)

wherein $R^1$ represents hydrogen or alkyl or aryl having 1 to 12 carbon atoms; and $R^2$ represents hydrogen or alkyl or aryl having 1 to 12 carbon atoms.

2. The method for manufacturing a polyimide-metal laminate according to claim 1, wherein after forming the self-supporting film from the solution of the polyamic acid (a), the film is imidized by heating at a maximum heating temperature of 320 to 370° C. to form the polyimide layer (a).

3. The method for manufacturing a polyimide-metal laminate according to claim 1,
wherein the polyimide film has a single layer structure of the polyimide layer (a), and
wherein forming the polyimide film comprises:
forming a self-supporting film from the solution of the polyamic acid (a) on a support, and then
imidizing by heating at a maximum heating temperature of 440° C. or lower after the self-supporting film is peeled from the support, to form the polyimide film having a single layer structure of the polyimide layer (a).

4. The method for manufacturing a polyimide-metal laminate according to claim 1,
wherein the polyimide film has a multilayer structure having the polyimide layers (a) and another polyimide layer (b), and
the polyimide layers (a) are disposed on both outermost sides of the multilayer structure, and the polyimide layer (b) is disposed in inner part of the multilayer structure, and
wherein the step of forming the polyimide film comprises:
forming a multilayer liquid film on a support, wherein the multilayer liquid film has at least three layers from the solution of the polyamic acid (a) and a solution of a polyamic acid (b) for forming the polyimide layer (b) such that at least the solution of the polyamic acid (a) forms the uppermost and the bottom layers, and
forming a self-supporting film from the multilayer liquid film formed on the support, and then
imidizing by heating at a maximum heating temperature of 440° C. or lower after the self-supporting film is peeled from the support to form the polyimide layers (a) and the polyimide layer (b).

5. The method for manufacturing a polyimide-metal laminate according to claim 1,
wherein the polyimide film has a multilayer structure having the polyimide layers (a) and another polyimide layer (b), and
the polyimide layers (a) are disposed on both outermost sides of the multilayer structure, and the polyimide layer (b) is disposed in inner part of the multilayer structure, and
wherein forming the polyimide film comprises:
applying the solution of the polyamic acid (a) to both sides of a self-supporting film produced on a support from a solution of a polyamic acid (b) for forming the polyimide layer (b) after the self-supporting film is peeled from the support, and
drying to form a self-supporting film having a multilayer structure, and then
imidizing by heating at a maximum heating temperature of 440° C. or lower to form the polyimide layers (a) and the polyimide layer (b).

6. The method for manufacturing a polyimide-metal laminate according to claim 1, wherein the diamine compound represented by general formula (1) is 2,4-bis(4-aminoanilino)-6-anilino-1,3,5-triazine.

7. The method for manufacturing a polyimide-metal laminate according to claim 1, wherein the diamine component comprises a diamine compound represented by general formula (1) in the range of 5 to 100 mol %.

8. The method for manufacturing a polyimide-metal laminate according to claim 1, wherein the diamine component comprises a diamine compound represented by general formula (1) in the range of 25 to 100 mol %.

9. The method for manufacturing a polyimide-metal laminate according to claim 1, wherein the diamine component further comprises at least one compound selected from para-phenylenediamine and 4,4'-diaminodiphenyl ether.

10. The method for manufacturing a polyimide-metal laminate according to claim 1, wherein the tetracarboxylic dianhydride component comprises at least one compound selected from 3,3',4,4'-biphenyltetracarboxylic dianhydride and pyromellitic dianhydride.

* * * * *